United States Patent
Yamada et al.

(10) Patent No.: US 11,781,653 B2
(45) Date of Patent: Oct. 10, 2023

(54) SEALING DEVICE

(71) Applicant: NOK CORPORATION, Tokyo (JP)

(72) Inventors: Takumi Yamada, Fukushima (JP);
Hiromi Sugihara, Fukushima (JP);
Hisato Yonai, Fukushima (JP); Toshiki Watanabe, Fukushima (JP); Satoshi Yamanaka, Fukushima (JP); Yu Yamaguchi, Fukushima (JP)

(73) Assignee: NOK CORPORATION

( * ) Notice: Subject to any disclaimer, the term of this patent is extended or adjusted under 35 U.S.C. 154(b) by 77 days.

(21) Appl. No.: 17/059,152

(22) PCT Filed: Jul. 2, 2019

(86) PCT No.: PCT/JP2019/026214
§ 371 (c)(1),
(2) Date: Nov. 25, 2020

(87) PCT Pub. No.: WO2020/013020
PCT Pub. Date: Jan. 16, 2020

(65) Prior Publication Data
US 2021/0215250 A1 Jul. 15, 2021

(30) Foreign Application Priority Data
Jul. 9, 2018 (JP) ................................ 2018-130299

(51) Int. Cl.
*F16J 15/18* (2006.01)
*F16J 15/3232* (2016.01)
(Continued)

(52) U.S. Cl.
CPC ............. *F16J 15/18* (2013.01); *F16J 15/324* (2013.01); *F16J 15/3232* (2013.01); *F16C 19/36* (2013.01); *F16C 33/78* (2013.01)

(58) Field of Classification Search
CPC ........ F16J 15/18; F16J 15/3232; F16J 15/324; F16J 15/3244; F16C 19/36; F16C 33/78
See application file for complete search history.

(56) References Cited

U.S. PATENT DOCUMENTS 3,572,730 A * 3/1971 Otto ...................... F16J 15/3244
277/400
3,620,540 A * 11/1971 Jagger .................. F16J 15/3244
277/560
(Continued)

FOREIGN PATENT DOCUMENTS

CN 103742651 A 4/2014
CN 104358880 A 2/2015
(Continued)

OTHER PUBLICATIONS

First Chinese Office Action for corresponding Application No. 201980034914.0 dated Apr. 21, 2022, with English translation (12 Pages).
(Continued)

*Primary Examiner* — Eugene G Byrd
*Assistant Examiner* — L. Susmitha Koneru
(74) *Attorney, Agent, or Firm* — Harness, Dickey & Pierce, P.L.C.

(57) ABSTRACT

A sealing device includes a reinforcing ring having annular shape around an axis line and an elastic body part formed from an elastic body, the elastic body part being attached to the reinforcing ring and having an annular shape around the axis line. The elastic body part includes an annular seal lip and an annular side lip that is provided on an outer side of the seal lip and that extends toward the outer side. In an inner peripheral surface of the side lip on an inner periphery side, at least one circumferential groove which is a groove having an annular shape around the axis line is provided and at least one axial groove which is a groove extending along a
(Continued)

direction of the axis line is provided. The circumferential groove and the axial groove are connected with each other.

5 Claims, 9 Drawing Sheets

(51) Int. Cl.
*F16J 15/324* (2016.01)
*F16C 19/36* (2006.01)
*F16C 33/78* (2006.01)

(56) References Cited

U.S. PATENT DOCUMENTS

| | | | | |
|---|---|---|---|---|
| 4,118,856 | A * | 10/1978 | Bainard | F16J 15/3244 |
| | | | | 277/924 |
| 6,634,648 | B1 * | 10/2003 | Rockwell | F16J 15/3252 |
| | | | | 277/560 |
| 9,309,615 | B2 * | 4/2016 | Heβ | D06F 37/20 |
| 9,638,329 | B2 * | 5/2017 | Yarimizu | F02F 11/007 |
| 2002/0163138 | A1 * | 11/2002 | Dietle | F16J 15/3244 |
| | | | | 277/559 |
| 2002/0185822 | A1 * | 12/2002 | Spain | F16J 15/3216 |
| | | | | 277/569 |
| 2003/0189293 | A1 * | 10/2003 | Johnen | F16J 15/3244 |
| | | | | 277/400 |
| 2004/0227304 | A1 * | 11/2004 | Kern | F16J 15/3228 |
| | | | | 277/559 |
| 2007/0241515 | A1 * | 10/2007 | Sato | F16C 33/7823 |
| | | | | 277/549 |
| 2008/0272556 | A1 | 11/2008 | Sato et al. | |
| 2008/0272558 | A1 | 11/2008 | Sato et al. | |
| 2010/0066030 | A1 * | 3/2010 | Kobayashi | F16J 15/324 |
| | | | | 277/402 |
| 2014/0175748 | A1 * | 6/2014 | Netzer | F16J 15/3244 |
| | | | | 277/309 |
| 2017/0122438 | A1 | 5/2017 | Hamamoto et al. | |
| 2018/0209546 | A1 * | 7/2018 | Nagahamaya | F16C 33/7823 |
| 2019/0277403 | A1 * | 9/2019 | Sakano | F16J 15/3256 |
| 2021/0003219 | A1 * | 1/2021 | Michikami | F16J 15/18 |
| 2021/0080007 | A1 * | 3/2021 | Watanabe | F16J 15/3456 |

FOREIGN PATENT DOCUMENTS

| | | |
|---|---|---|
| CN | 106461085 A | 2/2017 |
| EP | 1793146 A1 | 6/2007 |
| GB | 1215221 A | 12/1970 |
| JP | 2009-103142 A | 5/2009 |
| JP | 2013-050179 A | 3/2013 |
| JP | 2016-156418 A | 9/2016 |
| WO | 2008-093468 A1 | 8/2008 |
| WO | 2017-051920 A1 | 3/2017 |

OTHER PUBLICATIONS

Extended European Search Report for corresponding Application No. 19833313.0 dated Feb. 16, 2022 (7 Pages).
Notice of Reasons for Refusal for corresponding Japanese Application No. 2020-530126 dated May 24, 2021, with English translation (5 Pages).
International Search Report (English and Japanese) and Written Opinion (Japanese, with English translation) of the International Searching Authority issued in PCT/JP2019/026214, dated Sep. 10, 2019; ISA/JP with International Preliminary Report on Patentability Chapter 1.
Office Action issued in corresponding European Patent Application No. 19833313.0 dated Apr. 21, 2023 (3 Pages).

* cited by examiner

SEALING DEVICE

CROSS REFERENCE TO RELATED APPLICATIONS

The present application is a national stage application of International Patent Application No. PCT/JP2019/026214 filed on Jul. 2, 2019, which claims the benefit of Japanese Patent Application No. 2018-130299, filed on Jul. 9, 2018. The entire contents of the above applications are incorporated herein by reference in their entirety.

BACKGROUND

Technical Field

The present disclosure relates to a sealing device, and particularly relates to a sealing device used for a rotating shaft.

Related Art

Conventionally, sealing devices are used to seal a gap between a rotating shaft and a through-hole into which the shaft is inserted. Some of such sealing devices are used for mechanisms such as differential mechanisms in vehicles that are exposed to foreign matter such as muddy water, rainwater, and dust. Some of such sealing devices have a side lip formed so as to extend to an open-air side to prevent entry of foreign matter. The side lip is in contact with a member such as a deflector extending radially from a shaft and thereby prevents foreign matter from entering the inside from the open-air side.

FIG. 10 is a cross-sectional view of a conventional sealing device in a state of being attached to a differential mechanism provided in a transaxle, for example. As illustrated in FIG. 10, a conventional sealing device 100 includes an annular reinforcing ring 101 and an annular elastic body part 102 formed from an elastic body that is integrally formed with the reinforcing ring 101, and the elastic body part 102 includes a seal lip 103, a dust lip 104, and a side lip 105. The seal lip 103 in a usage state is in contact with an axle 111 of a differential mechanism 110 to thereby prevent lubricant in a housing 112 in which the differential mechanism 110 is housed from leaking out. The dust lip 104 is formed outside (at the open-air side of) the seal lip 103, and is in contact with or adjacent to the axle 111 to thereby prevent foreign matter from entering into the housing 112 from the outer side. The side lip 105 extends toward the outer side on an outer periphery side of the dust lip 104, and has a conical cylindrical shape that increases in diameter toward the outer side. As illustrated in FIG. 10, the side lip 105 in the usage state prevents foreign matter from entering from the outer side, with a distal end edge of the side lip 105 being in contact with a sliding surface 113a of an annular deflector 113 fixed to the axle 111. The side lip 105 is elastically deformed and curved in a state of being in contact with the deflector 113, and a sliding resistance is generated between the side lip 105 and the sliding surface 113a of the deflector 113 during rotation of the axle 111. Grease as a lubricant is applied to an inner peripheral surface of the side lip 105 to reduce the sliding resistance (for example, see Japanese Patent Application Publication No. 2009-103142).

In the conventional sealing device 100, the grease between the side lip 105 and the deflector 113 is used, as described above, to reduce the sliding resistance between the side lip 105 and the deflector 113. However, there may be a possibility that the grease between the side lip 105 and the deflector 113 is removed by centrifugal force caused by rotation of the deflector 113, resulting in a reduction in amount of the grease between the side lip 105 and the deflector 113. A reduction in the amount of the grease between the side lip 105 and the deflector 113 increases the sliding resistance by the side lip 105 to the deflector 113. This may facilitate wear on the side lip 105, cause weakening by heat generation, and lead to a decrease in sealing performance of the side lip 105.

Thus, the conventional sealing device used for the differential mechanism has been required to have a configuration that inhibits a reduction in amount of grease between the side lip and the deflector.

The present disclosure has been made in view of the above-described problem, and it is an object of the present disclosure to provide a sealing device capable of inhibiting a reduction in amount of lubricant between a side lip and a deflector.

SUMMARY

To achieve the above object, a sealing device according to the present disclosure is a sealing device for sealing between a through-hole and a shaft inserted through the through-hole, characterized by including: a reinforcing ring having an annular shape around an axis line; and an elastic body part formed from an elastic body, the elastic body part being attached to the reinforcing ring and having an annular shape around the axis line. The elastic body part includes a seal lip having an annular shape, the seal lip contacting the shaft such that the shaft is slidable; and a side lip having an annular shape, the side lip being provided on an outer side of the seal lip and extending toward the outer side. In a surface of the side lip on an inner periphery side, at least one circumferential groove that is a groove having an annular shape around the axis line is provided and at least one axial groove that is a groove extending along a direction of the axis line is provided. The circumferential groove and the axial groove are connected with each other.

In the sealing device according to one aspect of the present disclosure, the axial groove extends parallel to the axis line.

In the sealing device according to one aspect of the present disclosure, the axial groove extends diagonally with respect to the axis line.

In the sealing device according to one aspect of the present disclosure, a width of an end portion of the axial groove on the outer side is smaller than a width of an end portion of the axial groove on an inner side.

In the sealing device according to one aspect of the present disclosure, a plurality of the circumferential grooves are provided, and the axial groove is provided between the circumferential grooves adjacent to each other.

Effects of Disclosure

According to the sealing device according to the present disclosure, it is possible to inhibit a reduction in amount of lubricant between the side lip and a deflector.

DETAILED DESCRIPTION

Hereinafter, Embodiments of the present disclosure are described below with reference to the drawings.

Figure 1:
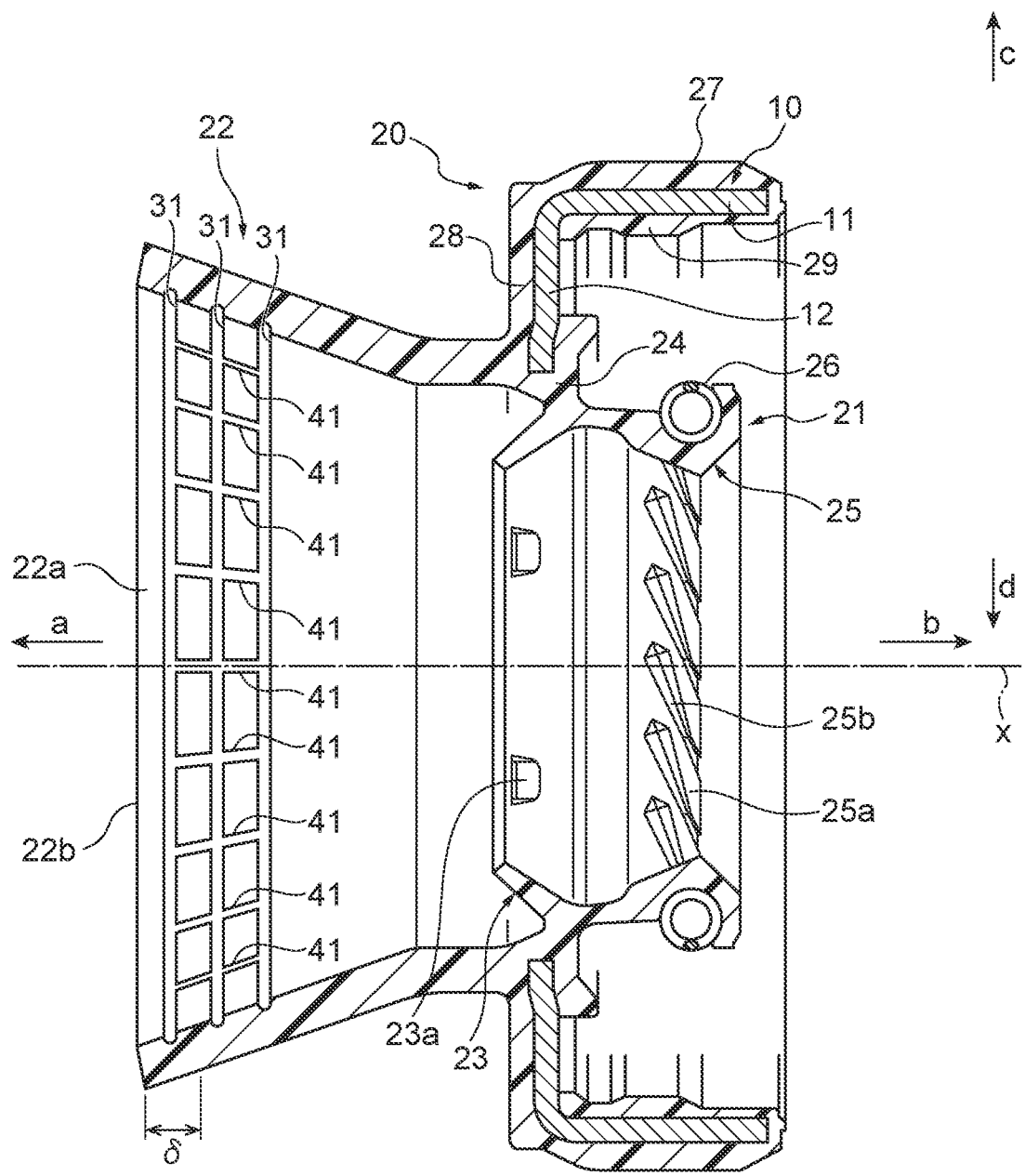
FIG. 1 is a cross-sectional view taken along an axis line for illustrating a schematic configuration of a sealing device according to a first embodiment of the present disclosure

FIG. 1 is a cross-sectional view taken along an axis line x for illustrating a schematic configuration of a sealing device 1 according to a first embodiment of the present disclosure. The sealing device 1 according to the first embodiment of the present disclosure is used to seal a gap between a through-hole and a shaft inserted through the through-hole, the through-hole and the shaft rotating relative to each other. The sealing device 1 is used, for example, for a device having a differential mechanism for absorbing a difference in rotational speed between right and left driving wheels during turning of a vehicle, a general purpose machine, or the like. Examples of the device having the differential mechanism include transaxles and differential devices. In the present embodiment, the sealing device 1 is used for a transaxle. Specifically, in the transaxle, the sealing device 1 is used for sealing between a through-hole formed in a housing and an axle as an output shaft of the differential mechanism, the axle being rotatably inserted through the through-hole, as described later. A component to which the sealing device 1 is applied is not limited to this specific example. The sealing device 1 can be applied to other rotating members in various machines.

Hereinafter, a direction directed by an arrow a in a direction of the axis line x (see FIG. 1) represents an outer side, and a direction directed by an arrow b in the direction of the axis line x (see FIG. 1) represents an inner side, for convenience of explanation. The outer side means a side facing the outside of a component to which the sealing device is applied, and the inner side means a side facing the inside of the component to which the sealing device is applied. More specifically, the outer side means a side facing the outside of the housing in the transaxle having a differential mechanism, and an atmosphere side, and the inner side means a side facing the inside of the housing in the transaxle. In a direction perpendicular to the axis line x (hereinafter also referred to as a "radial direction"), a direction away from the axis line x (a direction directed by an arrow c in FIG. 1) represents an outer periphery side, and a direction approaching the axis line x (a direction directed by an arrow d in FIG. 1) represents an inner periphery side.

The sealing device 1 includes a reinforcing ring 10 having an annular shape around the axis line x and an elastic body part 20 formed from an elastic body, is the elastic body part being attached to the reinforcing ring 10 and having an annular shape around the axis line x. The elastic body part 20 includes a seal lip 21 having an annular shape, the seal lip 21 contacting a shaft of the component to which the sealing device is applied such that the shaft is slidable, as described later, and a side lip 22 having an annular shape, the side lip 22 is provided on the outer side (an arrow a direction side) of the seal lip 21 and extending toward the outer side. In an inner peripheral surface 22a that is a surface of the side lip 22 on the inner periphery side, at least one circumferential groove 31 which is a groove having an annular shape around the axis line x is provided and at least one axial groove 41 which is a groove extending along a direction of the axis line x is provided. The circumferential groove 31 and the axial groove 41 are connected with each other. Hereinafter, a structure of the sealing device 1 will be described in detail.

As illustrated in FIG. 1, the reinforcing ring 10 is an annular member centered about or substantially centered about the axis line x and is made of metal. A shape of a cross section along the axis line x (hereinafter also referred to simply as a "cross section") of the reinforcing ring 10 is an L shape or a substantially L shape. The reinforcing ring 10, for example, includes a cylindrical part 11 that is a cylindrical or substantially cylindrical portion extending in the direction of the axis line x, and a disc part 12 that is a hollow disc-shaped portion extending toward the inner periphery side from an outer end portion of the cylindrical part 11. The cylindrical part 11 is formed such that the sealing device 1 is allowed to be fitted to an inner peripheral surface of the through-hole formed in the housing of the transaxle, as described later. The cylindrical part 11 may be arranged to be fitted in direct contact with the inner peripheral surface of the through-hole, or may be arranged to be fitted in contact with the inner peripheral surface of the through-hole through a portion of the elastic body part 20.

As illustrated in FIG. 1, the elastic body part 20 is attached to the reinforcing ring 10, and is integrally formed with the reinforcing ring 10 in such a manner that the elastic body part 20 covers the entire reinforcing ring 10 in the present embodiment. The elastic body part 20, as described above, includes the seal lip 21 and the side lip 22 and also includes an annular dust lip 23 that is provided on the outer side (the arrow a direction side) of the seal lip 21 and that extends toward the axis line x. The elastic body part 20 further includes an annular lip waist portion 24. The seal lip 21 is formed so as to be in contact with an axle of the differential mechanism such that the axle is slidable, as described later. The side lip 22 is formed so as to be in contact with an annular deflector fixed to the axle such that the deflector is slidable, and the side lip 22 extends toward the outer side on the outer periphery side of the dust lip 23 as described later. The dust lip 23 is provided on the outer side of the seal lip 21 and formed so as to be in contact with the axle such that the axle is slidable. In the elastic body part 20, the lip waist portion 24 is a portion positioned in the vicinity of an end portion on the inner periphery side of the disc part 12 of the reinforcing ring 10.

Specifically, the seal lip 21 is a portion that extends toward the inner side from the lip waist portion 24, and an annular portion centered about or substantially centered about the axis line x, and is formed so as to face the cylindrical part 11 of the reinforcing ring 10, as illustrated in FIG. 1. The seal lip 21 has an annular lip distal end portion 25 at an inner end portion, the lip distal end portion 25 having a cross section shape formed in a wedge shape projecting toward the inner periphery side. A garter spring 26 is fitted at a position facing away from the lip distal end portion 25 on the outer periphery side of the seal lip 21. The garter spring 26 presses the lip distal end portion 25 in a direction toward the axis line x to apply a tensional force of a predetermined magnitude to the lip distal end portion 25 against the axle such that the lip distal end portion 25 follows a displacement of the axle. The lip distal end portion 25 is in contact with an outer peripheral surface of the axle to seal between the sealing device 1 and the axle, as described later. As illustrated in FIG. 1, a plurality of screw projections 25b are formed at equal angle intervals in a circumferential direction on a taper surface 25a of a conical surface shape of the lip distal end portion 25 on the outer side, the screw projections 25b extending diagonally with respect to a distal end of the lip distal end portion 25 and projecting to the inner periphery side. The screw projections 25b generate air flow from the outer side to the inner side when the axle is slid, to thereby prevent lubricant from leaking from the inner side. The elastic body part 20 may not be provided with the screw projections 25b.

The dust lip 23 extends toward the outer side and the axis line x from the lip waist portion 24, more particularly, as illustrated in FIG. 1, the dust lip 23 extends in a direction toward the outer side and the inner periphery side from the lip waist portion 24. The dust lip 23 prevents foreign matter such as muddy water, sand, and dust from entering in a direction from the outer side toward the lip distal end portion 25. In the dust lip 23, in order that a negative pressure is not generated in a space between the dust lip 23 and the seal lip 21 in a usage state, a plurality of projections 23a projecting in the inner peripheral direction are formed at equal angle intervals in the circumferential direction so that a gap is formed by partially releasing the contact between the dust lip 23 and the axle to thereby suppress the generation of the negative pressure or eliminate the negative pressure. The dust lip 23 may be adjacent to the axle without being in contact with the axle, or may not have the projections 23a.

The elastic body part 20 includes a gasket part 27, a rear cover part 28, and a lining part 29. In the elastic body part 20, the gasket part 27 is a portion that covers the cylindrical part 11 of the reinforcing ring 10 from the outer periphery side. As described later, the thickness in the radial direction of the gasket part 27 is set so that, when, in the transaxle, the sealing device 1 is press-fitted into a through-hole through which the axle is inserted, the gasket part 27 is compressed between the through-hole and the cylindrical part 11 of the reinforcing ring 10 in the radial direction so that the gasket part 27 generates a fitting force of a predetermined magnitude in the radial direction. The rear cover part 28 is a portion that covers the disc part 12 of the reinforcing ring 10 from the outer side. The lining part 29 is a portion that covers the reinforcing ring 10 from the inner side and the inner periphery side.

As illustrated in FIG. 1, the side lip 22 extends from the lip waist portion 24 toward the outer side, an end portion of the side lip 22 on the outer side is wider than an end portion of the side lip 22 on the inner side. The side lip 22, for example, increases in diameter from the inner side to the outer side in the direction of the axis line x and has a shape such as a conical cylindrical or substantially conical cylindrical shape or a trumpet-like shape. As described above, in the inner peripheral surface 22a of the side lip 22, one or more of the circumferential grooves 31, which is annular around the axis line x, are formed and one or more of the axial grooves 41 extending along the direction of the axis line x are formed. Specifically, as illustrated in FIG. 1, in the inner peripheral surface 22a of the side lip 22, a plurality of the circumferential grooves 31 recessed from the inner peripheral surface 22a are formed, in addition, in the inner peripheral surface 22a of the side lip 22, a plurality of the axial grooves 41 recessed from the inner peripheral surface 22a are formed. Numbers of the circumferential grooves 31 and the axial grooves 41 are not limited to the numbers illustrated in the figure. The illustrated numbers are example numbers.

Figure 2:
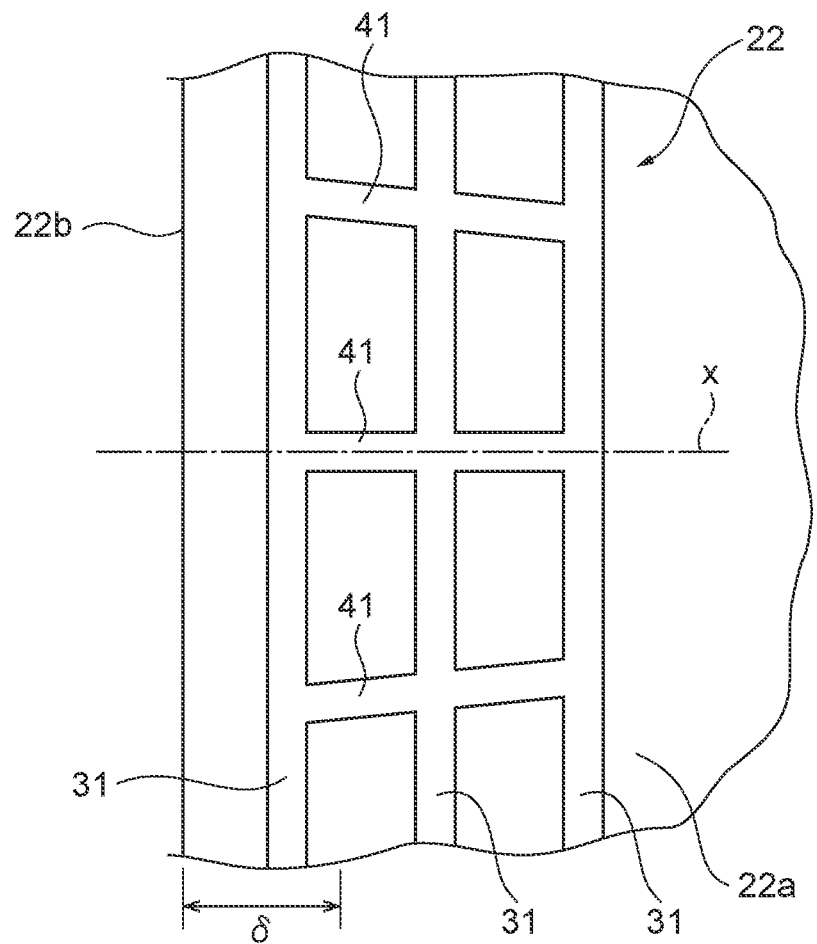
FIG. 2 is an enlarged view illustrating a portion of an inner peripheral surface of a side lip where circumferential grooves and axial grooves are formed in the sealing device illustrated in FIG. 1, the inner peripheral surface being viewed in a radial direction

FIG. 2 is an enlarged view illustrating a portion of the inner peripheral surface 22a of the side lip 22 where the circumferential grooves 31 and the axial grooves 41 are formed, the inner peripheral surface 22a being viewed in the radial direction. Specifically, as illustrated in FIGS. 1 and 2, the circumferential grooves 31 each extend in the shape of a circle or substantially circle centered or substantially centered about the axis line x. The circumferential grooves 31 are mutually concentric or substantially concentric circles. In the inner peripheral surface 22a, the circumferential grooves 31 are arranged at equal or substantially equal intervals in the direction of the axis line x.

Specifically, as illustrated in FIGS. 1 and 2, the axial grooves 41 extend parallel to or substantially parallel to the axis line x and are arranged at equal or substantially equal intervals in the circumferential direction in the inner peripheral surface 22a. The axial grooves 41 are connected or intersect with the circumferential grooves 31 and extend across, as illustrated in FIGS. 1 and 2, between the circumferential groove 31 at an innermost place and the circumferential groove 31 at an outermost place, for example. In an example illustrated in the figures, the axial grooves 41 reach and end at the circumferential groove 31 at the outermost place. However, the axial grooves 41 may penetrate through the circumferential groove 31 at the outermost place. Similarly, in the illustrated example, the axial grooves 41 reach and end at the circumferential groove 31 at the innermost place. The axial grooves 41 may penetrate through the circumferential groove 31 at the innermost place. The axial grooves 41 may not extend across between the circumferential groove 31 at the innermost place and the circumferential groove 31 at the outermost place but may each extend across between at least two of the adjacent circumferential grooves 31. However, in this case, the axial grooves 41 each extend such that the circumferential groove 31 at the innermost place communicates with the circumferential groove 31 at the outermost place through part or all of the axial grooves 41.

In the sealing device 1 in the usage state, as described later, a predetermined width (a seal width δ) of the inner peripheral surface 22a of the side lip 22 along the direction of the axis line x is in contact with the deflector. In the inner peripheral surface 22a, both or one of the circumferential grooves 31 and the axial grooves 41 are at least partly formed within a range of the seal width δ. The circumferential grooves 31 and the axial grooves 41 are also formed in an area on the inner side of the seal width δ. The circumferential grooves 31 and the axial grooves 41 may be formed in the area on the inner side of the seal width δ until a root of the side lip 22 (a part joined to the lip waist portion 24) or until a midway portion through the side lip 22. The circumferential grooves 31 and the axial grooves 41 do not reach an edge (a distal end edge 22b) on a distal end of the side lip 22.

Note that the elastic body part 20 is integrally formed from an elastic material, and the seal lip 21, the side lip 22, the dust lip 23, the lip waist portion 24, the gasket part 27, the rear cover part 28, and the lining part 29 are respective portions of the elastic body part 20 that is integrally formed from the elastic material.

The metal material for the reinforcing ring 10 is, for example, stainless steel or SPCC (a cold rolled steel sheet). Examples of the elastic body of the elastic body part 20 include various rubber materials. The various rubber materials are, for example, synthetic rubber such as nitrile rubber (NBR), hydrogenated nitrile rubber (H-NBR), acrylic rubber (ACM), and fluororubber (FKM). The reinforcing ring 10 is manufactured by press working or forging, for example, and the elastic body part 20 is molded with a mold by cross-linking (vulcanization). During the cross-linking, the reinforcing ring 10 is placed in the mold, the elastic body part 20 is bonded to the reinforcing ring 10 by cross-linking bonding, and the elastic body part 20 is integrally molded with the reinforcing ring 10.

Figure 3:
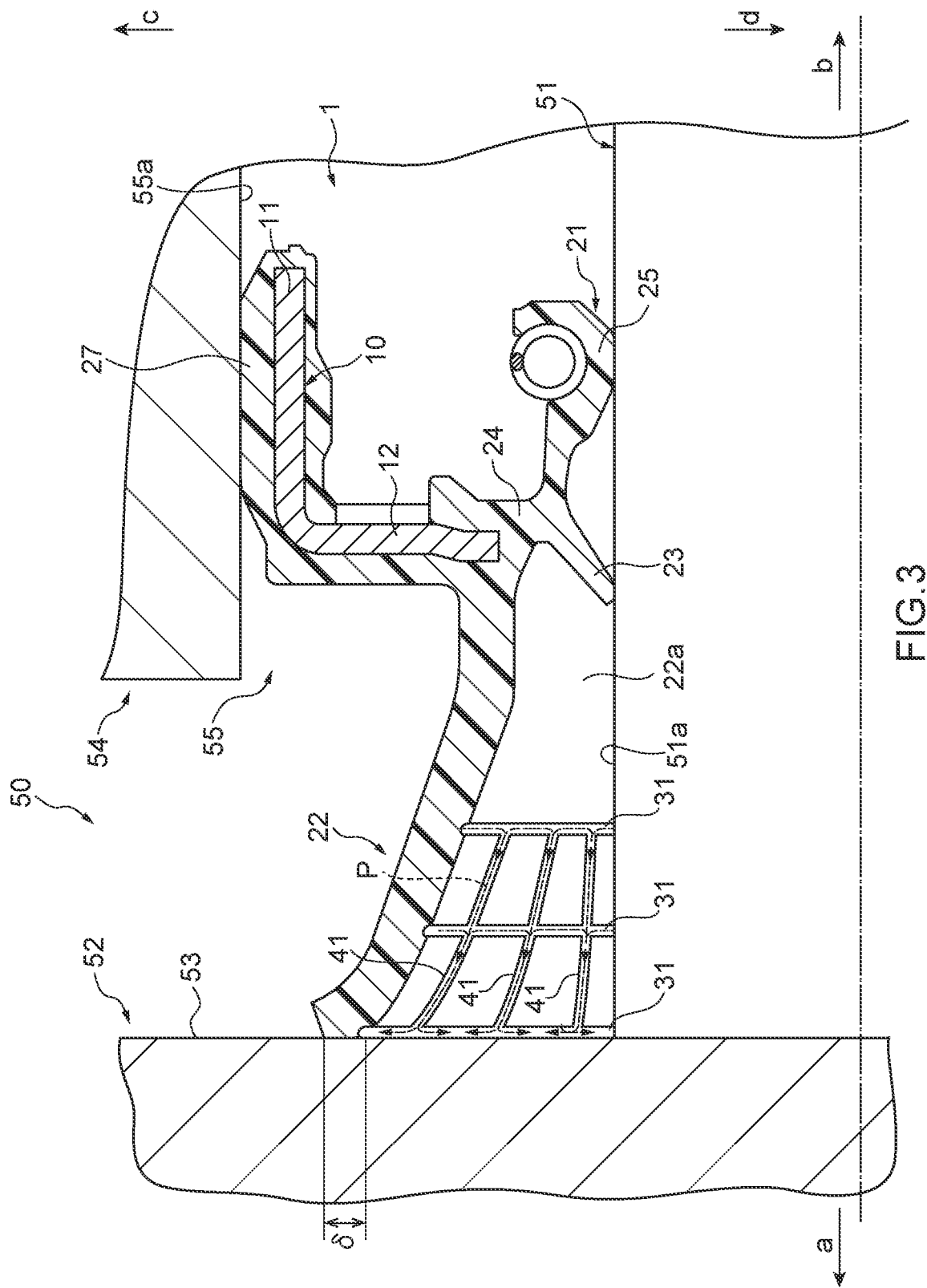
FIG. 3 is a view for illustrating the sealing device in a state of being attached to a transaxle that is an example of a component to which the sealing device is applied, and a partial enlarged cross-sectional view along the axis line enlargedly illustrating a vicinity of the sealing device in the transaxle
Figure 10:
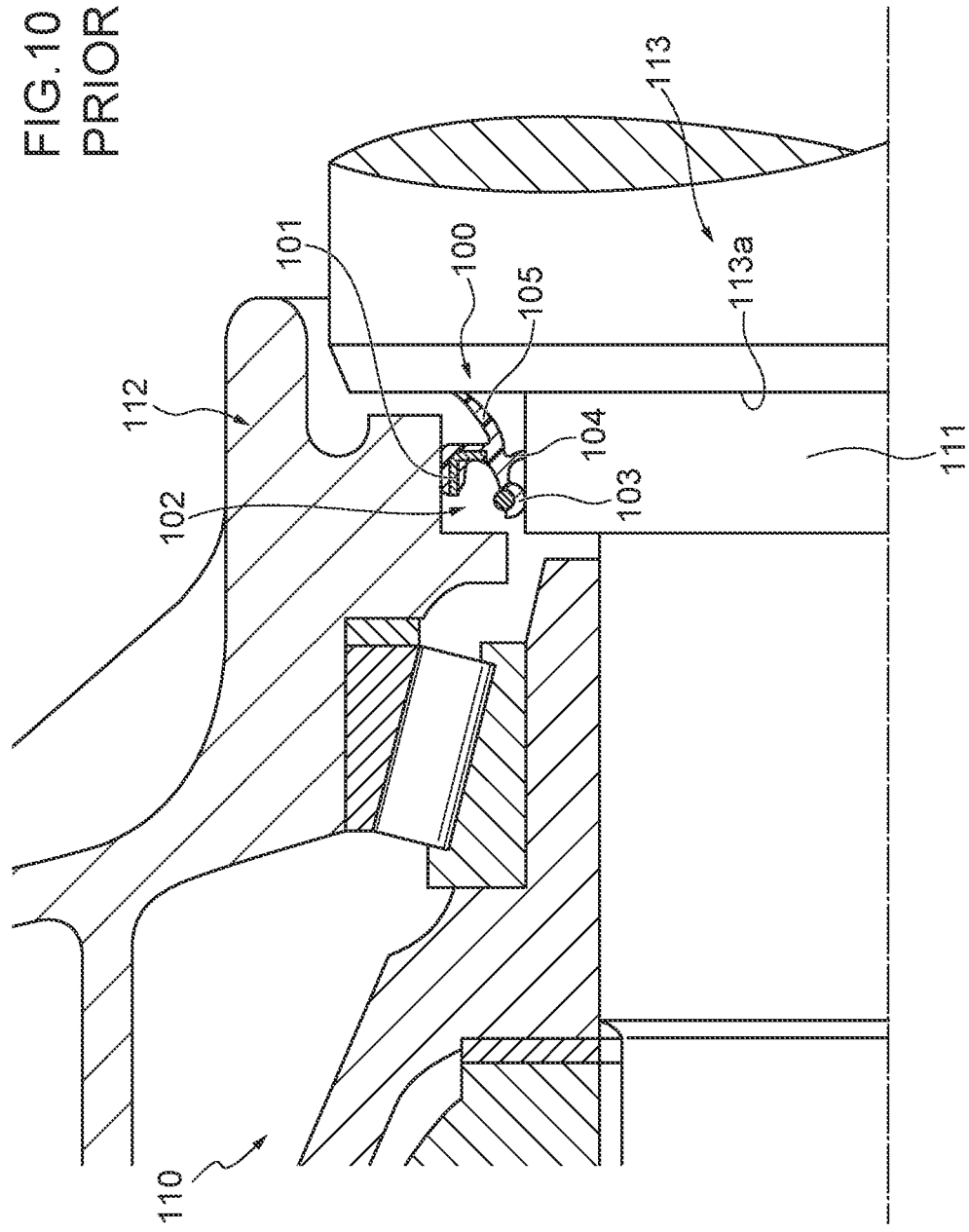
FIG. 10 is a cross-sectional view of a conventional sealing device in a state of being attached to a differential mechanism provided in a transaxle

Next, operation of the sealing device 1 having the above-described configuration will be described. FIG. 3 is a view for illustrating the sealing device 1 in a state of being attached to a transaxle 50 that is an example of a component to which the sealing device is applied, and a partial enlarged cross-sectional view along the axis line x enlargedly illustrating the vicinity of the sealing device 1 in the transaxle 50. Note that FIG. 3 illustrates a state where the sealing device 1 is attached to a desired position of the transaxle 50 (hereinafter referred to as an "initial state"). In other words, the sealing device 1 is attached to the transaxle 50 in such a manner that a part of the side lip 22 on the distal end edge 22b side is in contact with a sliding surface 53 of an annular deflector 52 by the desired seal width δ, the deflector 52 being fixed to an axle 51 as an output shaft of the differential mechanism (not illustrated) of the transaxle 50. The transaxle 50 is a well-known transaxle (see FIG. 10), and a detailed description of the configuration is omitted herein. Note that the deflector 52 may be formed by a member separate from the axle 51, or the deflector 52 may be formed by forming a part of the axle 51 to be annularly projected toward the outer periphery side.

As illustrated in FIG. 3, the sealing device 1 is fitted to a through-hole 55 formed in a housing 54 of the transaxle 50. The axle 51 is rotatably inserted through the through-hole 55. Note that the transaxle 50 is provided with two through-holes and two axles for right and left wheels, the through-holes and the axles corresponding to respective wheels have similar configurations, respectively, and the through-hole 55 and the axle 51 correspond to each of the right and left wheels, respectively.

In the through-hole 55 in the housing 54, a space between an outer peripheral surface 51a of the axle 51 and an inner peripheral surface 55a of the through-hole 55 is sealed by the sealing device 1. Specifically, the sealing device 1 is fitted to the through-hole 55, the gasket part 27 of the elastic body part 20 is compressed between the cylindrical part 11 of the reinforcing ring 10 and the inner peripheral surface 55a of the through-hole 55 so that the gasket part 27 is in close contact with the inner peripheral surface 55a of the through-hole 55, thereby sealing between the sealing device 1 and the through-hole 55 on the outer periphery side. The lip distal end portion 25 of the seal lip 21 of the elastic body part 20 is in contact with the outer peripheral surface 51a of the axle 51 so that the axle 51 is slidable, thereby sealing between the sealing device 1 and the axle 51 on the inner periphery side. Thus, the lubricant stored in the housing 54 is prevented from leaking out to the outside.

A distal end edge of the dust lip 23 is in contact with the outer peripheral surface 51a of the axle 51 in such a manner that the axle 51 is slidable, thereby preventing foreign matter from entering into the housing 54 from the outside. The dust lip 23 may not be in contact with the axle 51. The side lip 22 is in contact with the sliding surface 53 of the deflector 52, in the range of the seal width δ of the part of the inner peripheral surface 22a on the distal end edge 22b side, thereby preventing the foreign matter from entering into the housing 54 from the outside. Specifically, in the initial state, the part of the side lip 22 on the distal end edge 22b side is partially curved or is elastically deformed, and the inner peripheral surface 22a is in contact with the sliding surface 53 of the deflector 52 in the range of the seal width δ from the distal end edge 22b.

As described above, the circumferential groove 31 and the axial groove 41 are formed within the range of the seal width δ. The circumferential groove 31 and the axial groove 41 extend in the portion of the inner peripheral surface 22a of the side lip 22 that is in contact with the sliding surface 53 of the deflector 52 in the usage state. In other words, a part of the pluralities of the circumferential grooves 31 and the axial grooves 41 are in contact with (or face) the sliding surface 53 of the deflector 52 and each forms a space (a channel) between the sliding surface 53 of the deflector 52 and the inner peripheral surface 22a of the side lip 22 that is in contact with the sliding surface 53.

Grease as a lubricant is applied to the inner peripheral surface 22a of the side lip 22 to reduce a sliding resistance between the side lip 22 and the deflector 52. The grease is applied to an area of the seal width δ and an area on the inner side of the area of the seal width δ in the inner peripheral surface 22a of the side lip 22. More specifically, the grease is applied to at least a zone where the circumferential grooves 31 and the axial grooves 41 are formed in the area on the inner side of the area of the seal width δ, as well as to the area of the seal width δ. In other words, the grease is present in the circumferential grooves 31 and the axial grooves 41.

In response to rotation of the axle 51, the deflector 52 rotates and the sliding surface 53 of the deflector 52 slides over the inner peripheral surface 22a of the side lip 22. The grease applied to the area of the seal width δ is suctioned to the outer side by the sliding surface 53 of the deflector 52. In the sealing device 1 according to the present embodiment, the circumferential grooves 31 and the axial grooves 41 are formed, as described above, in the inner peripheral surface 22a of the side lip 22, at least one of the circumferential grooves 31 is at least partially formed in the zone of the seal width δ, and at least part of the axial grooves 41 enters the zone of the seal width. Thus, even if the grease on the inner peripheral surface 22a of the side lip 22 in the zone of the seal width δ is suctioned out by the rotation of the deflector 52, the grease in the axial grooves 41, the grease in the circumferential grooves 31, and the grease applied to the inner peripheral surface 22a of the side lip 22 are supplied, as indicated by dashed arrow lines P in FIG. 3, to the zone of the seal width δ through the axial groove 41. This, even if the grease on the inner peripheral surface 22a of the side lip 22 in the zone of the seal width δ is suctioned out by the rotation of the deflector 52, enables the supply of the grease applied to the inner peripheral surface 22a to the inner peripheral surface 22a of the side lip 22 in the zone of the seal width δ through the circumferential grooves 31 and the axial grooves 41. This can inhibit a reduction in amount of the grease on the inner peripheral surface 22a of the side lip 22 in the zone of the seal width δ.

In the transaxle 50, the axle 51 may be displaced inwardly in the direction of the axis line x so that the sliding surface 53 of the deflector 52 may be displaced in the direction of the axis line x, or the axle 51 may be inclined with respect to the axis line x so that the sliding surface 53 of the deflector 52 may be inclined, due to dimensional tolerance and assembly errors of each configuration. When the transaxle 50 is operated, the axle 51 may be displaced in the direction of the axis line x or displaced diagonally with respect to the axis line x due to the gap between respective configurations. If such a displacement (looseness) occurs, the side lip 22 vibrates. Vibrations from the side lip 22 facilitate movement of the grease to the zone of the seal width δ through the circumferential grooves 31 and the axial grooves 41. Thus, for a component with a substantial degree of looseness, such as a differential mechanism, to which the sealing device is attached, the circumferential grooves 31 and the axial grooves 41 of the side lip 22 work effectively.

In this way, the sealing device 1 according to the first embodiment of the present disclosure is capable of inhibiting a reduction in amount of lubricant between the side lip 22 and the deflector 52.

The sealing device 1 can, as described above, inhibit a reduction in the amount of the grease on the inner peripheral surface 22a of the side lip 22 in the area of the seal width δ and keep lubrication between the side lip 22 and the deflector 52 within the seal width δ in a state that the grease is in at the start of use of the sealing device or in a state close to the state that the grease is in at the start of use of the sealing device. Thus, the sealing device can inhibit wear on the side lip 22 and weakening by heat generation and inhibit a reduction in sealing performance of the side lip 22 against foreign matter.

Figure 4:
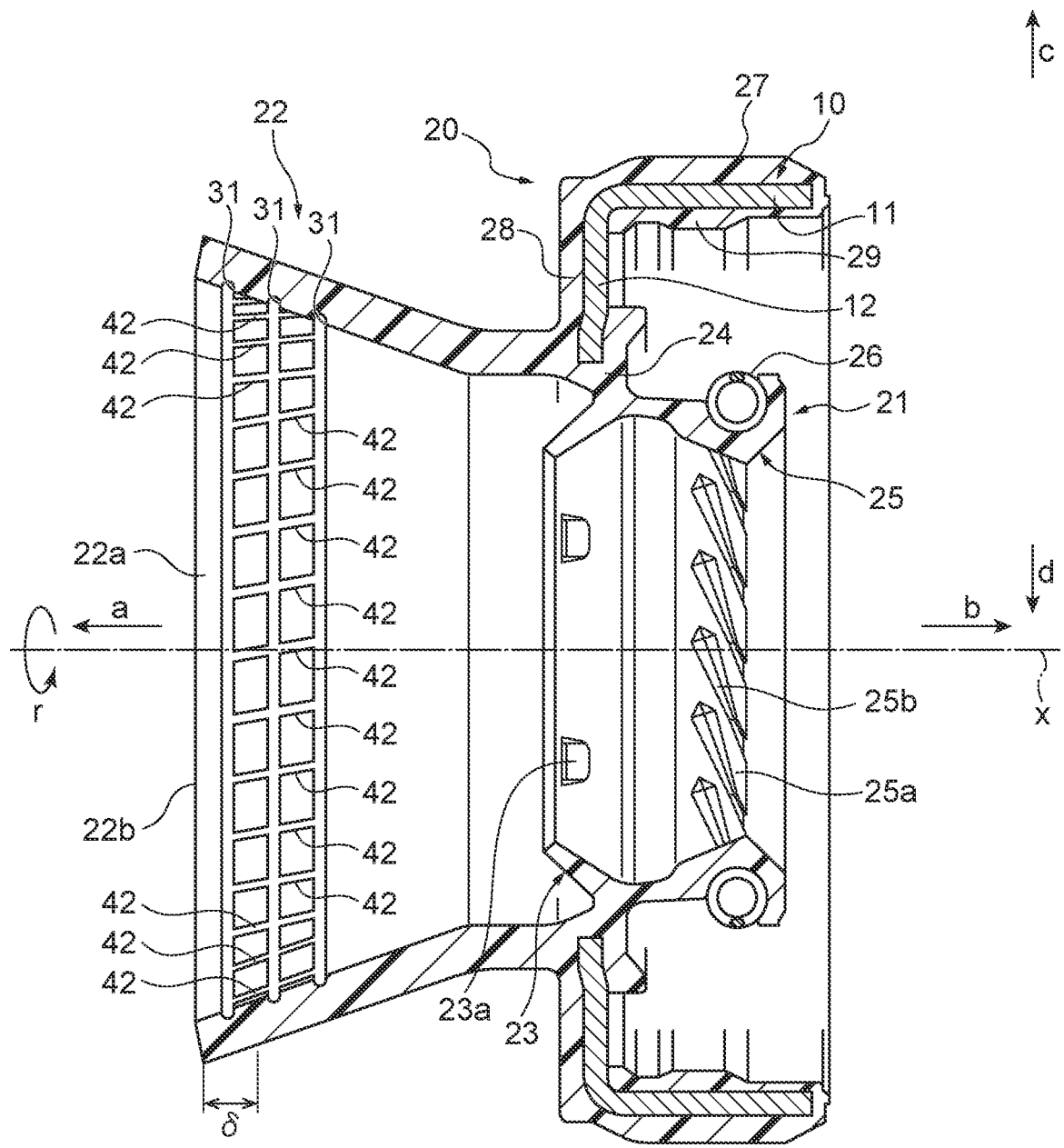
FIG. 4 is a cross-sectional view taken along an axis line for illustrating a schematic configuration of a sealing device according to a second embodiment of the present disclosure

Next, a sealing device 2 according to a second embodiment of the present disclosure will be described. FIG. 4 is a cross-sectional view taken along the axis line x for illustrating a schematic configuration of the sealing device 2 according to the second embodiment of the present disclosure. The sealing device 2 according to the second embodiment of the present disclosure differs in axial groove structure from the sealing device 1 described above according to the first embodiment of the present disclosure. Hereinafter, components of the sealing device 2 according to the second embodiment of the present disclosure that are identical or similar in function to those of the sealing device 1 according to the first embodiment of the present disclosure are assigned the same reference signs, and descriptions thereof are omitted. Parts that differ between the sealing devices will be described.

Figure 5:
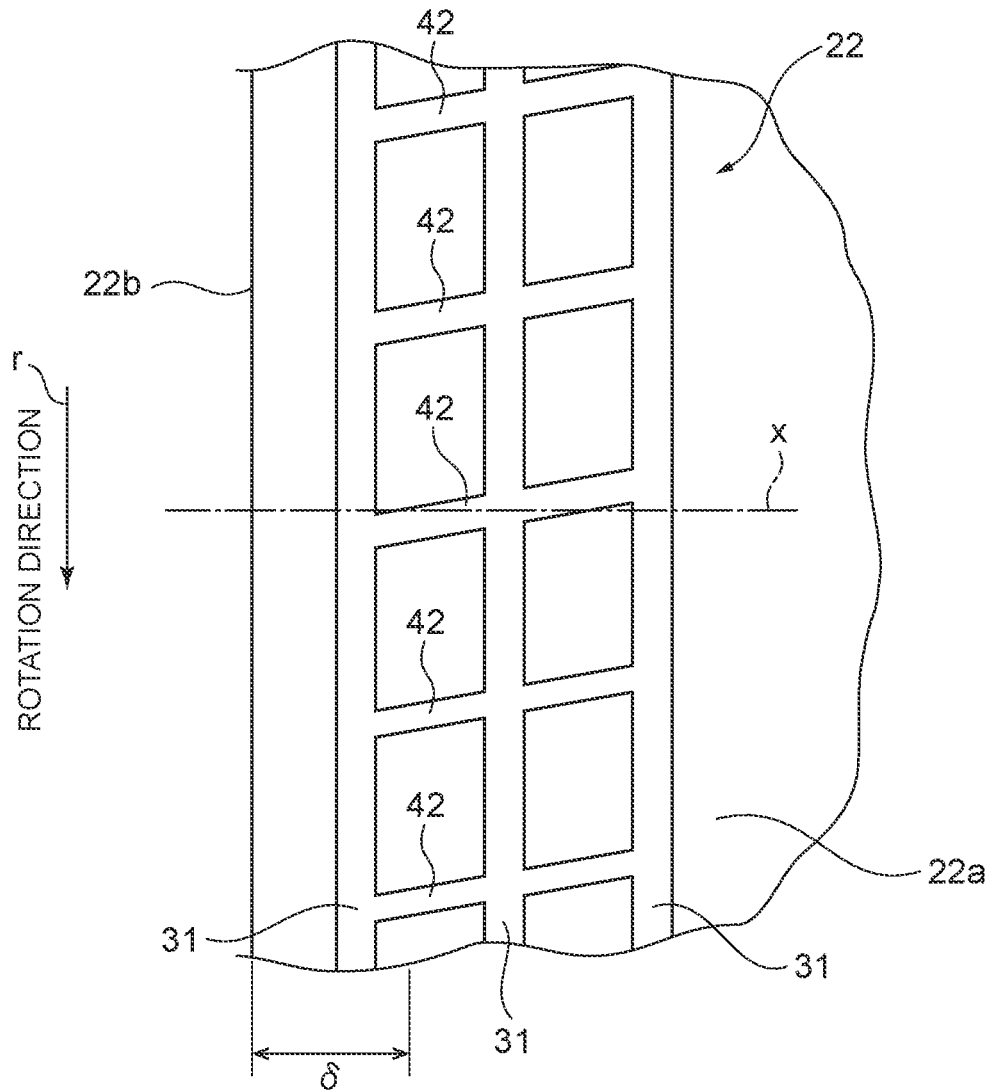
FIG. 5 is an enlarged view illustrating a portion of an inner peripheral surface of a side lip where circumferential grooves and axial grooves are formed in the sealing device illustrated in FIG. 4, the inner peripheral surface being viewed in a radial direction

The sealing device 2 has at least one axial groove 42 that differs from the axial groove 41 of the sealing device 1 described above in an inner peripheral surface 22a of a side lip 22. In the present embodiment, the sealing device 2 has a plurality of the axial grooves 42. FIG. 5 is an enlarged view illustrating a portion of the inner peripheral surface 22a of the side lip 22 where circumferential grooves 31 and the axial grooves 42 are formed, the inner peripheral surface 22a being viewed in the radial direction. As illustrated in FIGS. 4 and 5, the axial grooves 42 are grooves recessed from the inner peripheral surface 22a, extending in the inner peripheral surface 22a diagonally with respect to the axis line x. Specifically, the axial grooves 42 are diagonal with respect to the axis line x toward a rotation direction r of the axle 51. In other words, the axial grooves 42 extend diagonally toward the rotation direction from the inner side to the outer side. If the axle 51 rotates in both a forward direction and a reverse direction, the rotation direction r is the forward rotation direction and the axial grooves 42 extend diagonally with respect to the axis line x toward the forward rotation direction of the axle 51. The axial grooves 42 may extend diagonally with respect to the axis line x toward the reverse rotation direction of the axle 51.

In a similar way to the axial grooves 41, the axial grooves 42 are arranged at equal or substantially equal intervals in the circumferential direction in the inner peripheral surface 22a. The axial grooves 42 are connected or intersect with the circumferential grooves 31 and extend across, as illustrated in FIGS. 4 and 5, between the circumferential groove 31 at an innermost place and the circumferential groove 31 at an outermost place, for example. In an example illustrated in the figures, the axial grooves 42 reach and end at the circumferential groove 31 at the outermost place. However, the axial grooves 42 may penetrate through the circumferential groove 31 at the outermost place. Similarly, in the illustrated example, the axial grooves 42 reach and end at the circumferential groove 31 at the innermost place. The axial grooves 42 may penetrate through the circumferential groove 31 at the innermost place. The axial grooves 42 may not extend across between the circumferential groove 31 at the innermost place and the circumferential groove 31 at the outermost place but may each extend across between at least two of the adjacent circumferential grooves 31. However, in this case, the axial grooves 42 each extend such that the circumferential groove 31 at the innermost place communicates with the circumferential groove 31 at the outermost place through part or all of the axial grooves 42. In the inner peripheral surface 22a, in a similar way to the axial grooves 41 described above, both or one of the circumferential grooves 31 and the axial grooves 42 are at least partially formed within a range of a seal width δ. The grooves 31 and 41 are also formed in an area on the inner side of the seal width δ. The axial grooves 42 may be formed in the area on the inner side of the seal width δ until a root of the side lip 22 or until a midway portion through the side lip 22. The axial grooves 42 do not reach a distal end edge 22b of the side lip 22.

In the sealing device 2 in the usage state, the circumferential grooves 31 and the axial grooves 42 work and produce effects in a similar way to the circumferential grooves 31 and the axial grooves 41 of the sealing device 1. Since the axial grooves 42 extend diagonally with respect to the axis line x in particular, the grease is readily supplied toward the distal end edge 22 of the side lip 22 through the axial grooves 42 in response to rotation of the axle 51. In other words, when the axle 51 rotates, the axial grooves 42 act as screw grooves for the grease.

In this way, the sealing device 2 according to the second embodiment of the present disclosure is capable of inhibiting a reduction in amount of lubricant between the side lip 22 and the deflector 52.

Figure 6:
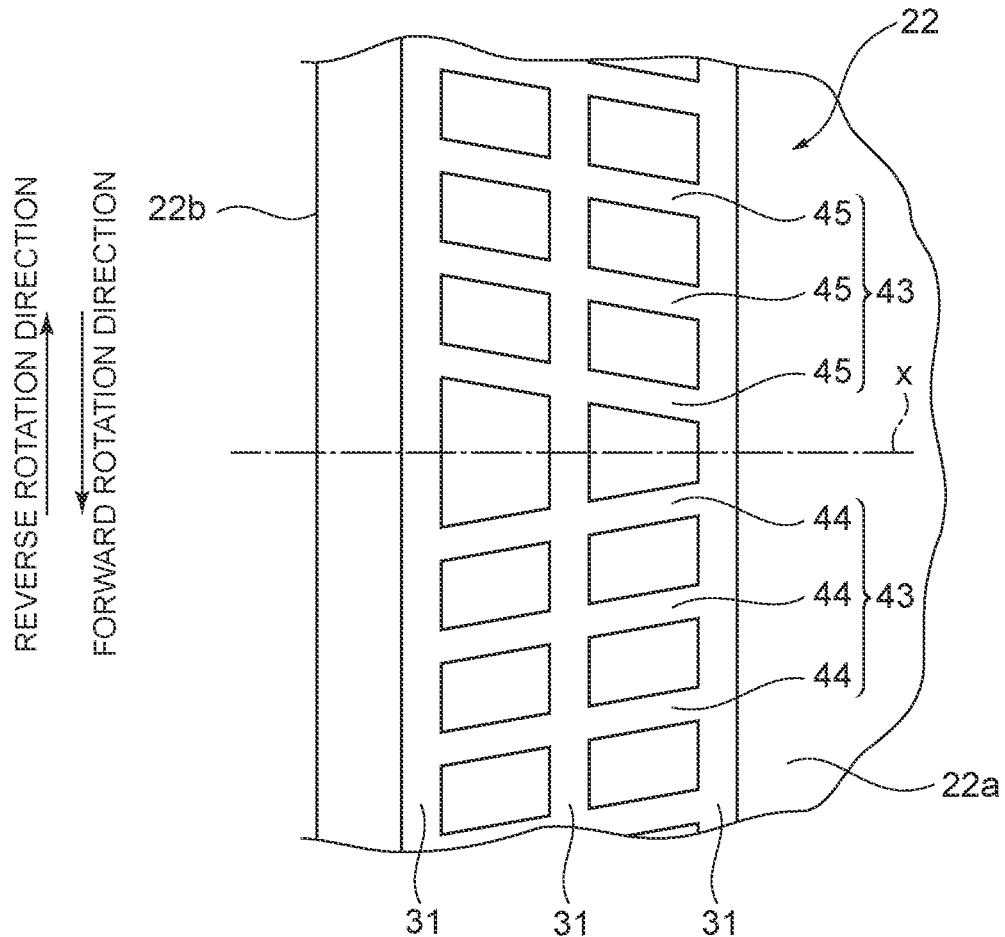
FIG. 6 is a view for illustrating a modified example of the axial groove in the sealing device according to the second embodiment of the present disclosure

Next, a modified example of the axial groove in the sealing device 2 according to the second embodiment of the present disclosure will be described. As illustrated in FIG. 6, the sealing device 2 may have an axial groove group 43 that includes an axial groove 44 for forward rotation and an axial groove 45 for reverse rotation instead of the axial groove 42 in the inner peripheral surface 22a of the side lip 22. In a similar way to the above-described axial groove 42, the axial groove 44 for forward rotation is a groove recessed from the inner peripheral surface 22a of the side lip 22, extending diagonally with respect to the axis line x toward the forward rotation direction of the axle 51. The axial groove 45 for reverse rotation is a groove recessed from the inner peripheral surface 22a of the side lip 22, extending diagonally to a side opposite the axial groove 44, i.e., extending diagonally with respect to the axis line x toward the reverse rotation direction of the axle 51.

In the axial groove group 43, the axial groove 44 for forward rotation and the axial groove 45 for reverse rotation are disposed so as to be symmetric or substantially symmetric about a line. The axial groove group 43 includes a plurality of the axial grooves 44 for forward rotation and the axial grooves 45 for reverse rotation as many as the axial grooves 44 for forward rotation. In the axial groove group 43, the axial grooves 44 and the axial grooves 45 are formed at equal or substantially equal intervals in the inner peripheral surface 22a of the side lip 22, respectively. In the axial groove group 43, the axial grooves 44 and the axial grooves 45 may not be formed at equal intervals in the inner peripheral surface 22a of the side lip 22, respectively. In the axial groove group 43, only one axial groove 44 for forward rotation and only one axial groove 45 for reverse rotation may be formed.

The axial groove group 43 formed may be only one, or a plurality of the axial groove groups 43 may be formed. If a plurality of the axial groove groups 43 are formed, the axial groove groups 43 are formed at equal or substantially equal intervals in the inner peripheral surface 22a of the side lip 22. The axial groove groups 43 may not be formed at equal intervals in the inner peripheral surface 22a of the side lip 22. In an example illustrated in the figure, in the axial groove group 43, the axial grooves 44 for forward rotation are disposed on a forward rotation direction side of the axial grooves 45 for reverse rotation but may be disposed conversely, i.e., the axial grooves 44 for forward rotation may be disposed on a reverse rotation direction side of the axial grooves 45 for reverse rotation.

The axial groove group of this modified example in the usage state works in a similar way to the axial grooves 42 of the sealing device 2 described above. In particular, when the axle 51 rotates in the forward direction, in response to the rotation of the axle 51, the grease is readily supplied toward the distal end edge 22 of the side lip 22 through the axial grooves 44 for forward rotation. On the other hand, when the axle 51 rotates in the reverse direction, in response to the rotation of the axle 51, the grease is readily supplied toward the distal end edge 22 of the side lip 22 through the axial grooves 45 for reverse rotation.

Figure 7:
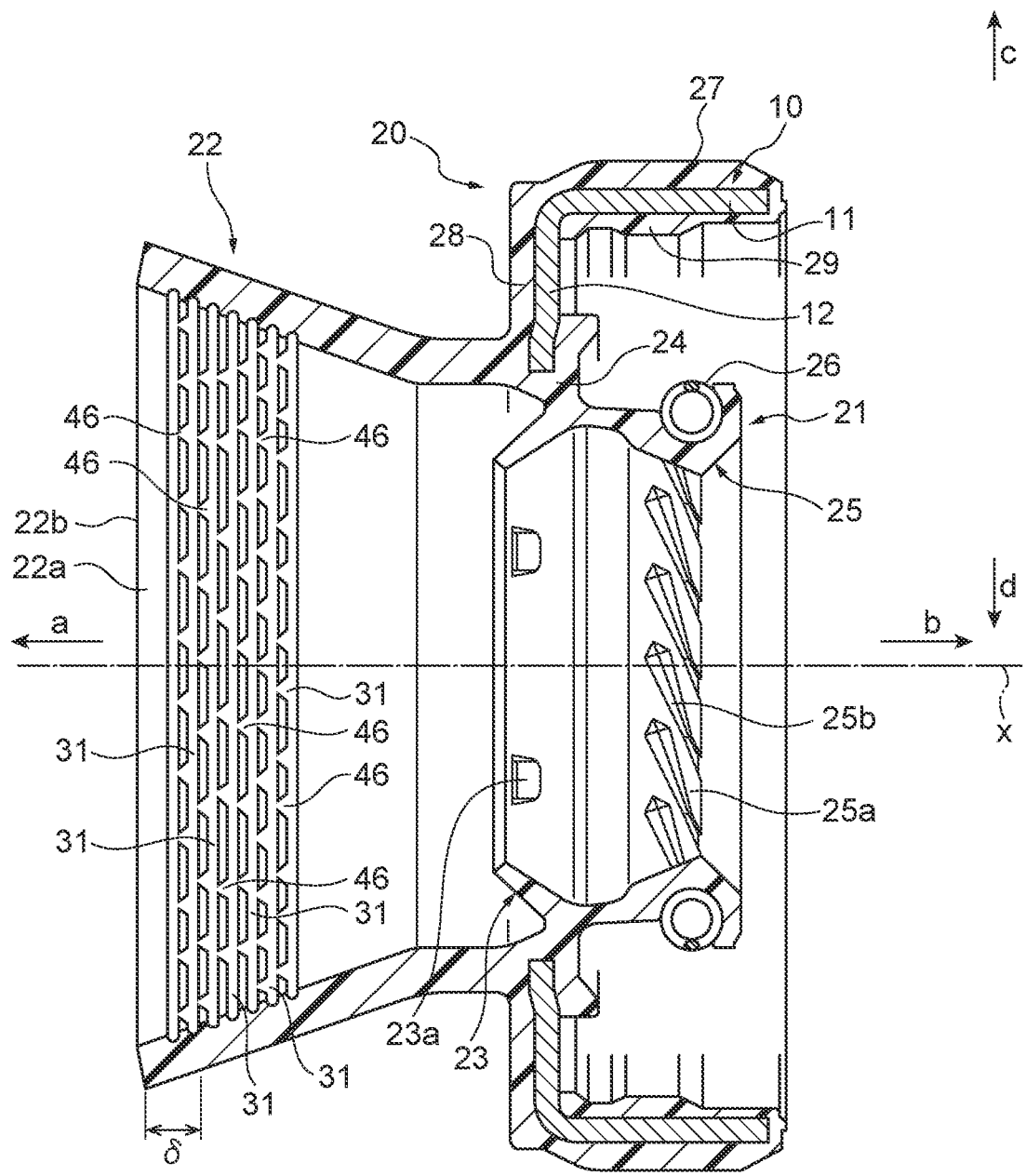
FIG. 7 is a cross-sectional view taken along an axis line for illustrating a schematic configuration of a sealing device according to a third embodiment of the present disclosure

Next, a sealing device 3 according to a third embodiment of the present disclosure will be described. FIG. 7 is a cross-sectional view taken along the axis line x for illustrating a schematic configuration of the sealing device 3 according to the third embodiment of the present disclosure. The sealing device 3 according to the third embodiment of the present disclosure differs in axial groove structure from the sealing device 1 described above according to the first embodiment of the present disclosure. Hereinafter, components of the sealing device 3 according to the third embodiment of the present disclosure that are identical or similar in function to those of the sealing device 1 according to the first embodiment of the present disclosure are assigned the same reference signs, and descriptions thereof are omitted. Parts that differ between the sealing devices will be described.

Figure 8:
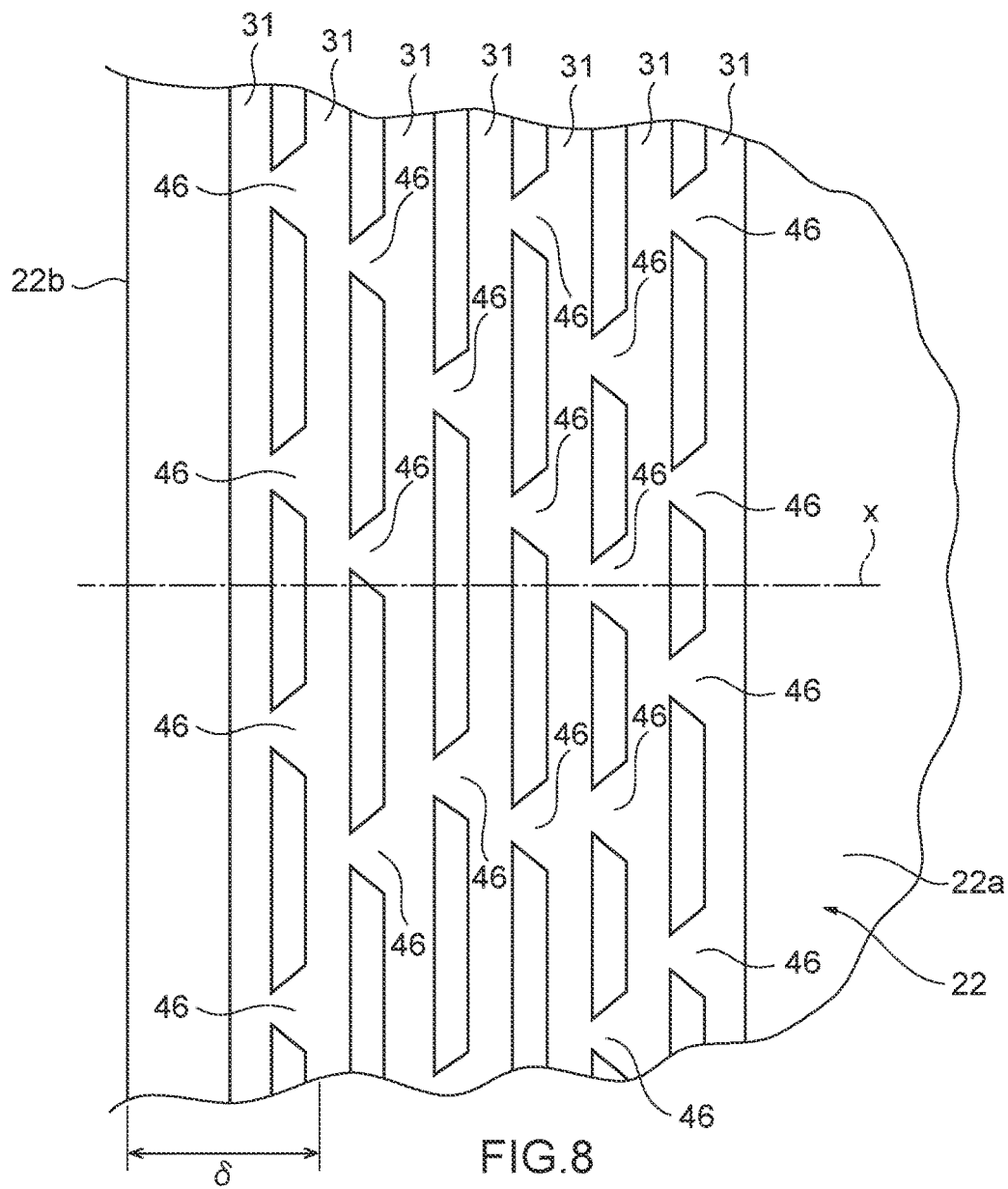
FIG. 8 is an enlarged view illustrating a portion of an inner peripheral surface of a side lip where circumferential grooves and axial grooves are formed in the sealing device illustrated in FIG. 7, the inner peripheral surface being viewed in a radial direction
Figure 9:
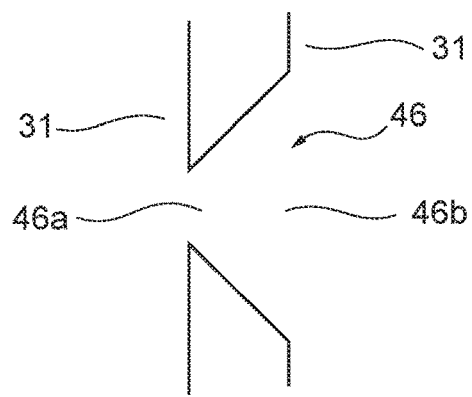
FIG. 9 is an enlarged view illustrating the axial groove in the sealing device illustrated in FIG. 7

The sealing device 3 has at least one axial groove 46 that differs from the axial groove 41 of the sealing device 1 described above in an inner peripheral surface 22a of a side lip 22. In the present embodiment, the sealing device 3 has a plurality of the axial grooves 46. FIG. 8 is an enlarged view illustrating a portion of the inner peripheral surface 22a of the side lip 22 where circumferential grooves 31 and the axial grooves 46 are formed, the inner peripheral surface 22a being viewed in the radial direction. FIG. 9 is an enlarged view illustrating the axial groove 46. As illustrated in FIGS. 8 and 9, the axial grooves 46 are grooves recessed from the inner peripheral surface 22a. A circumferential width of an end portion of the axial groove 46 on the outer side (an outer side end portion 46a) is smaller than a circumferential width of an end portion of the axial groove 46 on the inner side (an inner side end portion 46b). The outer side end portion 46a is a portion where the axial groove 46 connects to the circumferential groove 31 on the outer side, and the inner side end portion 46b is a portion where the axial groove 46 connects to the circumferential groove 31 on the inner side.

The axial groove 46 is formed between the circumferential grooves 31 adjacent to each other. One or a plurality of the axial grooves 46 are formed in every space between the circumferential grooves 31 adjacent to each other. If a plurality of the axial grooves 46 are formed in every space between the circumferential grooves 31 adjacent to each other, the axial grooves 46 are arranged at equal or substantially equal intervals in the circumferential direction in the inner peripheral surface 22a. The axial grooves 46 may not be arranged at equal intervals in the circumferential direction in the inner peripheral surface 22a. The circumferential grooves 31 and the axial grooves 46 are formed in the inner peripheral surface 22a such that both or one of the circumferential groove 31 and at least one of the axial grooves 46 are at least partially positioned within a range of a seal width δ. The axial grooves 46 do not reach a distal end edge 22b of the side lip 22.

In the sealing device 3 in the usage state, the circumferential grooves 31 and the axial grooves 46 work and produce effects in a similar way to the circumferential grooves 31 and the axial grooves 41 of the sealing device 1. Since the axial grooves 46 each have a tapered shape from the inner side to the outer side in particular, the grease is readily supplied from the inner side to the outer side, i.e., toward the distal end edge 22 of the side lip 22, through the axial grooves 46. On the other hand, the entry of foreign matter such as muddy water, rainwater, and dust into the housing from the outside to the inner side through the axial grooves 46 is difficult.

In this way, the sealing device 3 according to the third embodiment of the present disclosure is capable of inhibiting a reduction in amount of lubricant between the side lip 22 and the deflector 52. The sealing device is also capable of hindering the entry of foreign matter into the inside from the outside through the axial grooves 46.

Although the embodiments of the present disclosure have been described above, the present disclosure is not limited to the sealing devices 1 to 3 according to the embodiments of the present disclosure, and includes any modes falling within the scope of the concept and claims of the present disclosure. Respective configurations may be appropriately selectively combined to solve at least part of the above-described problems and achieve at least part of the above-described effects. For example, in the above-described embodiments, the shape, material, arrangement, size and the like of each component can be appropriately changed according to a specific use mode of the present disclosure.

For instance, the circumferential grooves 31 and the axial grooves 41, 42, 44, 45, 46 may not be arranged at equal intervals in the inner peripheral surface 22a but may be arranged, for example, at a regular pattern of pitches. The circumferential grooves 31 and the axial grooves 41, 42, 44, 45, 46 may not extend linearly or substantially linearly but may extend curvedly.

The invention claimed is:

1. A sealing device for sealing between a through-hole and a shaft inserted through the through-hole, the shaft having a deflector, the sealing device comprising:
   a reinforcing ring having an annular shape around an axis line; and
   an elastic body part formed from an elastic body, the elastic body part being attached to the reinforcing ring and having an annular shape around the axis line,
   wherein the elastic body part includes a seal lip having an annular shape, the seal lip contacting the shaft such that the shaft is slidable; and
   a side lip having an annular shape, the side lip being provided on an atmosphere side of the seal lip and extending toward the atmosphere side,
   wherein the side lip increases in diameter from the inner side to the atmosphere side in the direction of the axis line,
   on an inner peripheral surface of the side lip, a plurality of circumferential grooves that are grooves having an annular shape around the axis line are provided and at least one axial groove that is a groove extending along a direction of the axis line is provided,
   the circumferential grooves and the axial groove are connected with each other,
   one of the plurality of circumferential grooves that is positioned nearest to the atmosphere side is located within a seal width of the side lip where the inner peripheral surface of the side lip contacts the deflector along the direction of the axis line, and
   the other circumferential grooves of the plurality of circumferential grooves are formed in an area of the inner peripheral surface of the side lip located inboard from the seal width.

2. The sealing device according to claim 1, wherein the axial groove extends parallel to the axis line.

3. The sealing device according to claim 1, wherein the axial groove extends diagonally with respect to the axis line.

4. The sealing device according to claim 1, wherein a width of an end portion of the axial groove on the atmosphere side is smaller than a width of an end portion of the axial groove on an inner side.

5. The sealing device according to claim 4, wherein the axial groove is provided between the circumferential grooves adjacent to each other.

\* \* \* \* \*